April 14, 1931.  G. D. SUNDSTRAND  1,800,267
OVERARM CLAMPING MEANS
Filed March 5, 1928
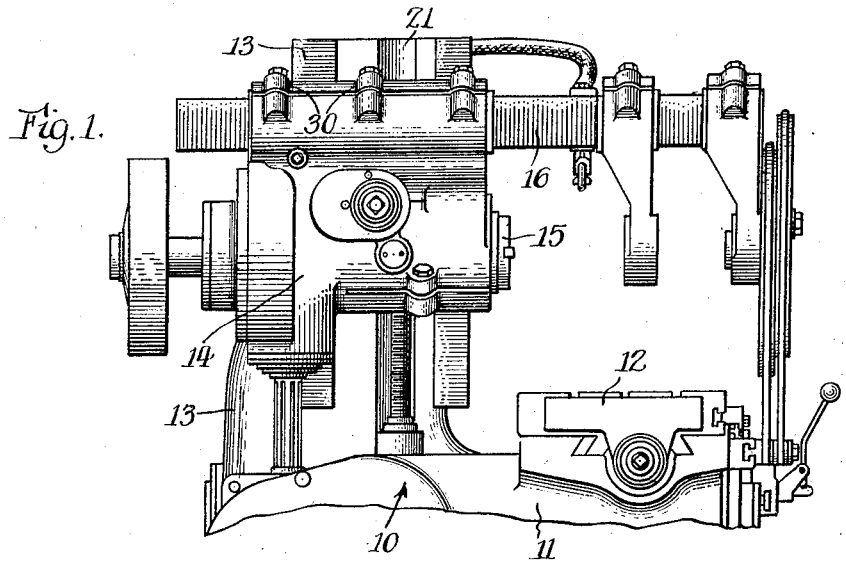
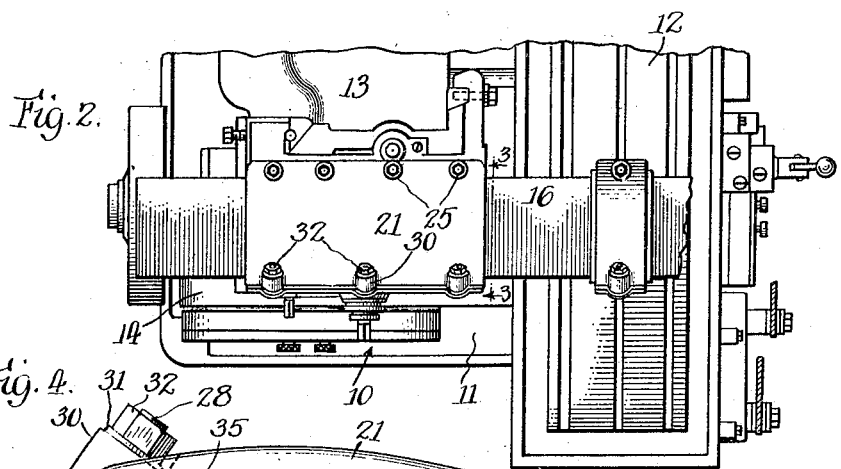
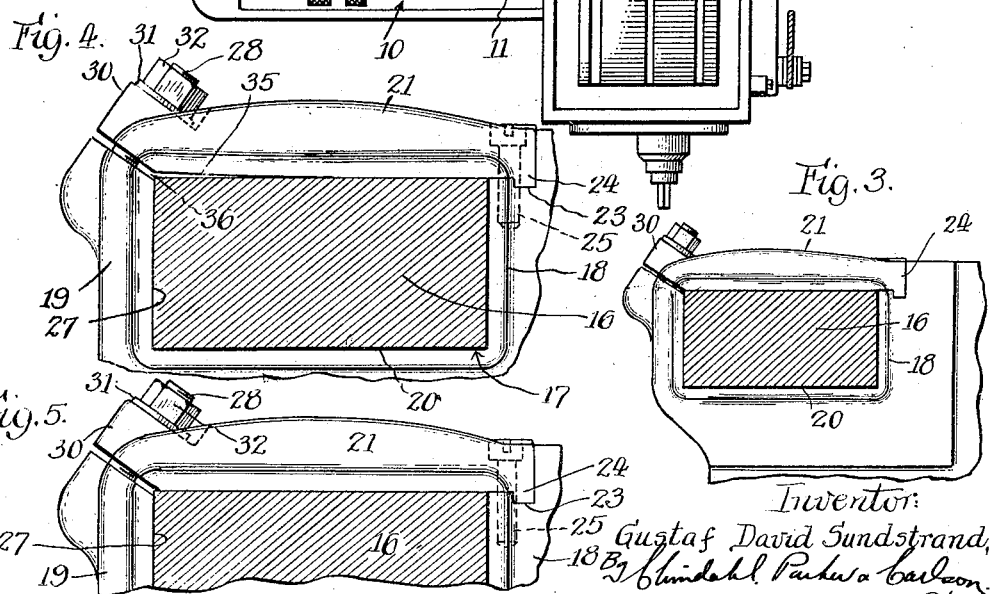
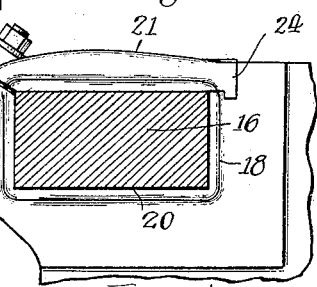
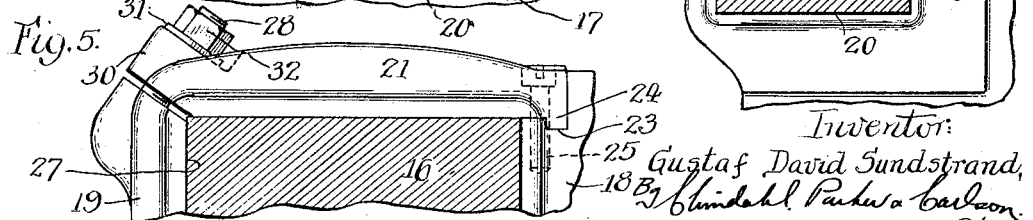
Inventor:
Gustaf David Sundstrand,
By Chindahl, Parker & Carlson
Attys.

Patented Apr. 14, 1931

1,800,267

UNITED STATES PATENT OFFICE

GUSTAF DAVID SUNDSTRAND, OF ROCKFORD, ILLINOIS, ASSIGNOR TO SUNDSTRAND MACHINE TOOL CO., OF ROCKFORD, ILLINOIS, A CORPORATION OF ILLINOIS

OVER-ARM-CLAMPING MEANS

Application filed March 5, 1928. Serial No. 259,114.

The invention relates generally to machine tools and more particularly to a novel clamping means for rigidly securing an adjustable overarm in position on such a machine.

It is well known in the art that the accuracy and uniformity of the work produced by a machine tool depends to a great extent upon the rigidity with which the tool or cutter arbor is supported in the machine frame, but in spite of this knowledge it is the common practice, in machines having overhanging arbors, to provide an outboard bearing for the arbor, which bearing is mounted on a projecting arm. Such arbor or tool supporting arm commonly referred to as an ovearm in milling machines is preferably supported for longitudinal adjustment so as to increase the range of work which may be done by the machine. The effectiveness of the arm as a brace or steadying means for the tool or arbor depends largely, therefore, upon the rigidity of the adjustable connection of the arm with the body or frame of the machine and it is the object of the present invention to provide a novel clamping means for this adjustable connection which will insure the maximum rigidity of the arm relative to the frame of the machine.

For purposes of disclosure the invention is shown in the accompanying drawings as applied to a milling machine having a base or bed 10 which has a work support or table 12 slidable transversely upon a forwardly projecting portion 11 thereof. A vertically extending column portion 13 has a movable frame element or head 14 slidably mounted thereon for adjustment vertically thereof, this head carrying a horizontal rotatably mounted spindle 15 and a forwardly projecting overarm 16.

It will be understood that although I have disclosed herein an overarm structure for a milling machine having a slidable spindle head, the invention is equally well adapted for embodiment in knee type milling machines wherein the overarm is mounted directly upon the column, as well as in other machine tools embodying supporting arms. The scope of the invention will be defined in the appended claims.

A further object is to provide an improved clamping means for the supporting arm which serves not only to clamp the overarm rigidly but also to definitely position the overarm relative to the body of the machine so that the surfaces of the overarm may be used by the operator as gage surfaces from which measurements may be made to position the work in the machine.

Another object is to provide an overarm clamping plate having a curved inner surface, adapted to span the groove in which an overarm is mounted and to be secured to the sides thereof in such a manner as to spring the plate to cause contact of substantially the entire inner surface of the plate with the adjacent surface of the overarm.

Other objects and advantages will become apparent from the following description and from the accompanying drawings, in which:

Fig. 1 is a fragmental elevational view of a milling machine embodying the preferred form of the present invention.

Fig. 2 is a fragmental plan view of the machine shown in Fig. 1.

Fig. 3 shows a fragmental elevational view taken partially in section along the line 3—3 of Fig. 2.

Fig. 4 is an enlarged fragmental vertical section taken along the line 3—3 of Fig. 2, showing the clamping means in unclamped position.

Fig. 5 is an enlarged fragmental view similar to Fig. 4 showing the clamping means in clamped position.

The overarm 16, as herein shown, is of non-circular or rectangular cross section and is adapted to fit in a groove 17, (Fig. 4) formed in the head 14 by upstanding side walls or surfaces 18 and 19 which are formed along the sides of a flat surface 20. Such a groove and overarm may be machined with great accuracy and by providing means operable to hold or clamp the overarm firmly in contact with for example, surfaces 18 and 20, the overarm will be supported rigidly and in a definite relation to the other parts of the machine. As herein illustrated this clamping means comprises a plate 21 which is adapted to span the top of the groove 17, to contact the top surface of the overarm 16, and to be secured to the top edges of the side walls 18 and 19.

In the preferred form of the invention the side wall 19 is made relatively thin so that in case there is any space between this wall and the side of the overarm, the wall may be drawn laterally into contact with the overarm so as to press the overarm against the surface 18 of the head. When the overarm has been firmly clamped in position, the operator may feel sure that it is in contact with the wall 18 and thus definitely positioned in a known vertical plane so that the sides of the overarm may be used as gage surfaces from which measurements may be taken to position the work.

A groove 23 is preferably formed along the top of the wall 18 to receive a downwardly extending flange 24 on one edge of the plate 21. The engagement of the flange 24 and the groove 23 serves to position the plate 21 on the head and also serves to prevent lateral displacement of the plate. A plurality of tap screws 25 are provided which extend through suitable apertures in the plate and engage threaded apertures in the head to maintain the plate in position thereon.

Means is provided for securing the other edge of the plate 21 to the top edge of the side wall 19 and in its preferred form this means serves also to draw the side wall 19 firmly against the adjacent side 27 of the overarm. As herein illustrated this means comprises a plurality of bolts 28 secured in the side wall 19 at spaced intervals along the top edge thereof and extending upwardly and inwardly therefrom. Suitable lugs 30 are formed on the edge of the plate 21 having apertures therein arranged to receive the bolts 28. The bolts extend through the apertures and have washers 31 and nuts 32 thereon. Due to the angular position of the bolts 28 relatively to both the side wall 19 and the plate 21, the tightening of the nuts 32 on the bolts serves to draw both the plate and the wall firmly against the overarm 16.

In order to insure a uniform contact between the under surface of the overarm and the surface 20 on the frame element, the plate 21 is so formed that it must be distorted to a slight extent during the clamping operation. To this end the plate herein illustrated is formed with an inner surface 35 which is slightly arcuate transversely (Fig. 4) or convex downwardly toward the overarm. Thus when the plate is secured to the head by the tap screws 25, the surface 35 will contact the overarm 16 for only a short distance adjacent that wall and will then diverge upwardly away from the upper surface of the overarm at a rate which gradually increases toward the other side of the plate. In practice with an arm seven inches wide, the gap 36 (Fig. 4) is preferably about four one-thousands of an inch.

The tightening of the nuts 32 will serve to spring the plate 21 to a slight extent and if the nuts are tightened sufficiently, the entire surface 35 of the plate will be caused to engage the overarm and to exert a uniform downward force thereon. Thus the overarm will be clamped firmly against the lower surface 20 and definitely positioned in a known horizontal plane so that the operator may also use the lower surface thereof as a gage surface from which measurements may be taken to position the work. As above pointed out, this tightening of the nuts 32 will, in this embodiment, also serve to draw the wall 19 firmly against the overarm and thus clamp the overarm effectively against the surface 18 and definitely position the overarm in a known vertical plane.

From the foregoing description it will be apparent that the invention provides novel overarm clamping means which will serve invariably to contact the overarm at a sufficient number of points to insure the maximum rigidity and definite positioning of the arm relative to the frame element of the machine on which it is mounted.

I claim as my invention:

1. In a milling machine having a frame element, a rectangular groove formed therein and a rectangular overarm positioned partly in said groove, means for clamping said overarm in said groove comprising a plate adapted to span said groove, means for rigidly securing one side of said plate to said frame element adjacent the side of said groove, said plate having a curved inner surface which, when the plate is rigidly secured to the frame element at one side of the groove, contacts said overarm for a short distance and then diverges away from the surface of the overarm, and means for securing the other side of said plate to the frame element at the other side of the groove, said means being operable to spring said plate so that substantially the entire inner surface thereof contacts said overarm whereby to press said overarm uniformly into contact with the bottom of said groove.

2. A milling machine having, in combination, a frame element, a work table mounted for transverse movement in front of said frame element, a rectangular overarm extending from said frame element over said work table, said frame element having one plane surface formed thereon parallel to the plane of movement of the work table and another plane surface perpendicular to the path of movement of said table, said overarm being adapted to contact said surfaces to position said overarm relative to said work table so that the underside of the arm may be used for gaging purposes, and means for clamping said overarm in such contact, said means comprising a thin side wall formed on said frame element along said overarm parallel to said perpendicular surface, and a plate having a normally curved under surface to contact the top surface of the overarm adapted to be secured along the edge of the perpendicular surface and to span across said overarm and be clamped to said side wall, and means connecting said plate and said wall operable to spring said plate and draw said wall into contact with said overarm to press said overarm into firm contact with both of said surfaces.

3. A milling machine having, in combination, a frame element, a horizontally movable work table mounted thereon, an overarm extending over said work table, said frame element having a groove formed therein having a plane bottom surface parallel to the plane of movement of said table, said overarm having a bottom surface adapted to contact the bottom surface of said groove so as to be definitely positioned relatively to said frame element, and means operable to clamp firmly said overarm in such contact, said means comprising a plate adapted to span said groove and having an inner surface formed so as normally to diverge away from the surface of said overarm at its edges, and means operable to spring said plate so that substantially the entire inner surface of said plate contacts said overarm.

4. The combination with a machine tool having a frame, a supporting arm, and a groove in said frame to receive said arm, of means for clamping said arm firmly in said groove, and particularly against one side thereof said means comprising a removable plate adapted to span said groove on the opposite side and having an inner surface to abut said arm, said surface normally diverging away from the surface of said arm at an increasing rate, and means operable to draw the edges of the plate toward the frame so as to distort the plate and bring substantially the entire area of its inner surface into clamping engagement with the adjacent surface of the arm.

5. In combination with a machine frame having a groove therein, an arm mounted in said groove projecting from the frame, and means for clamping the arm in said groove comprising a plate adapted to span said groove and to be secured to the frame along the sides thereof, said plate having a transversely normally curved surface arranged to abut the adjacent surface of the arm, and means for securing the sides of said plate to the frame operable to spring said plate so that substantially the entire normally curved surface thereof is in contact with the adjacent surface of the arm.

6. In a machine, in combination, a frame element, a supporting arm rectangular in section projecting from said element and having one side surface arranged to be used as a gage surface, and means to clamp said arm to said frame element including a normally curved plate positioned against the opposite side of the arm, and means to secure said plate to the frame element adapted to straighten said plate into uniform contact with the arm.

In testimony whereof, I have hereunto affixed my signature.

GUSTAF DAVID SUNDSTRAND.